Feb. 9, 1971 A. A. ADAMS ET AL 3,562,070

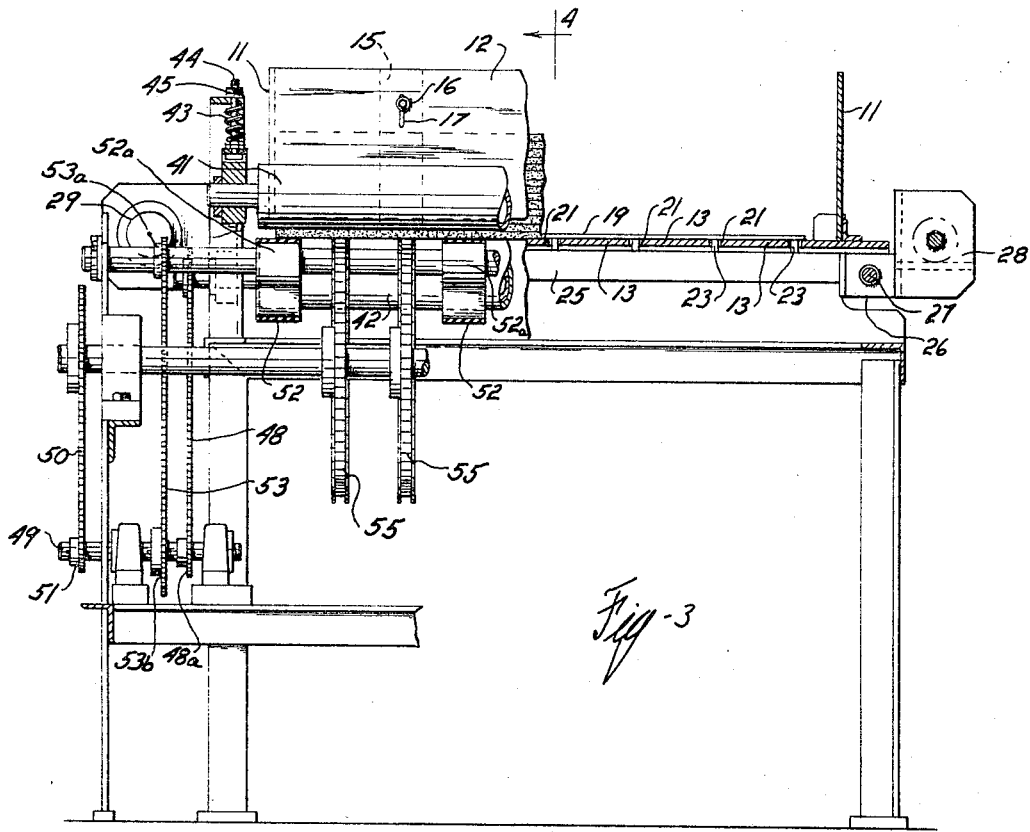
Fig-3
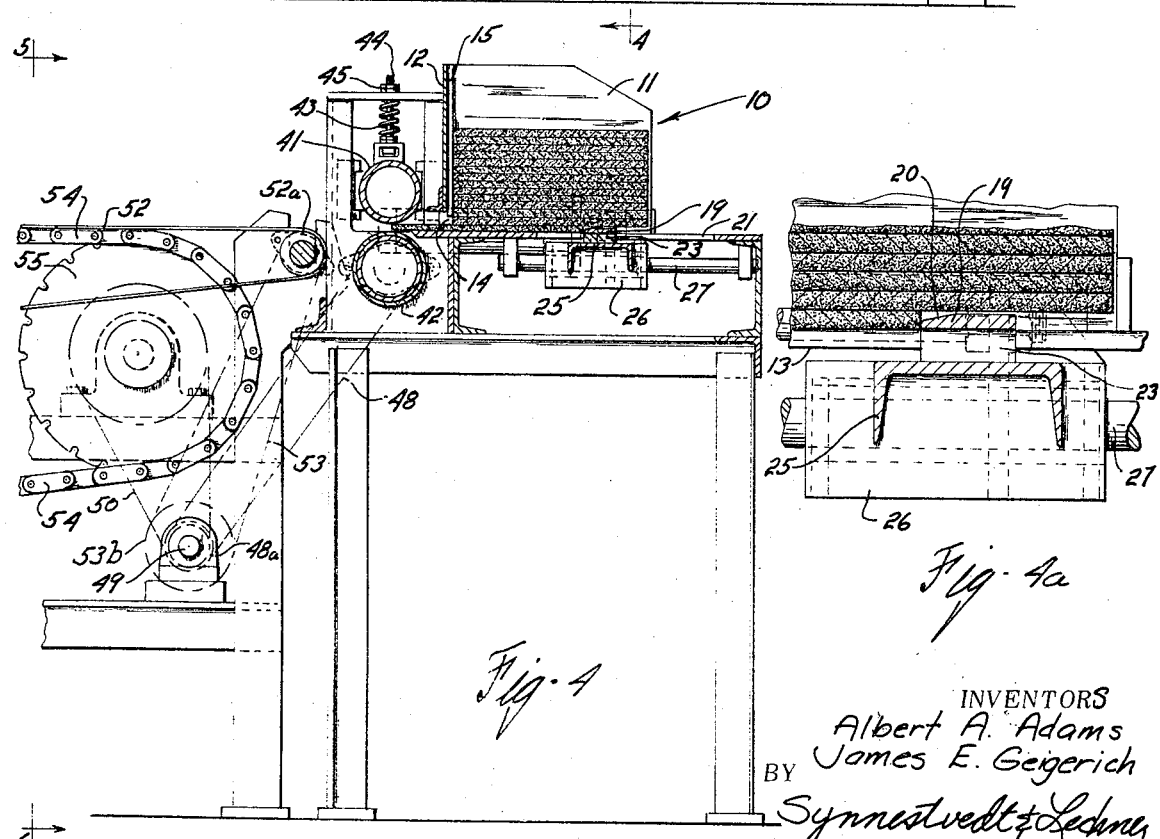
Fig-4
Fig-4a
INVENTORS
Albert A. Adams
James E. Geigerich
BY Synnestvedt & Lechner
ATTORNEY

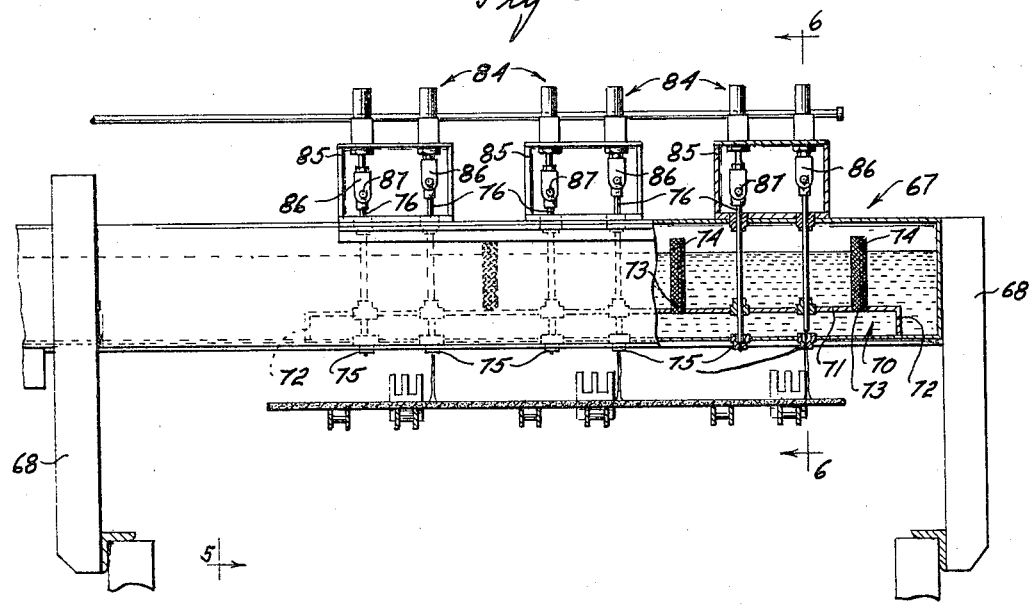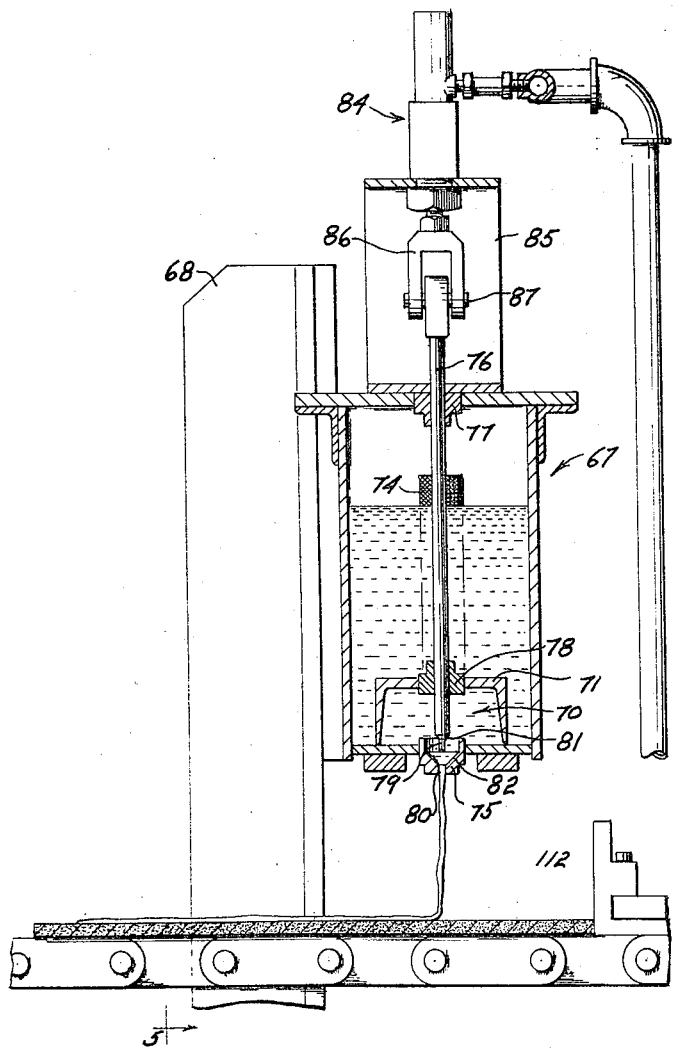

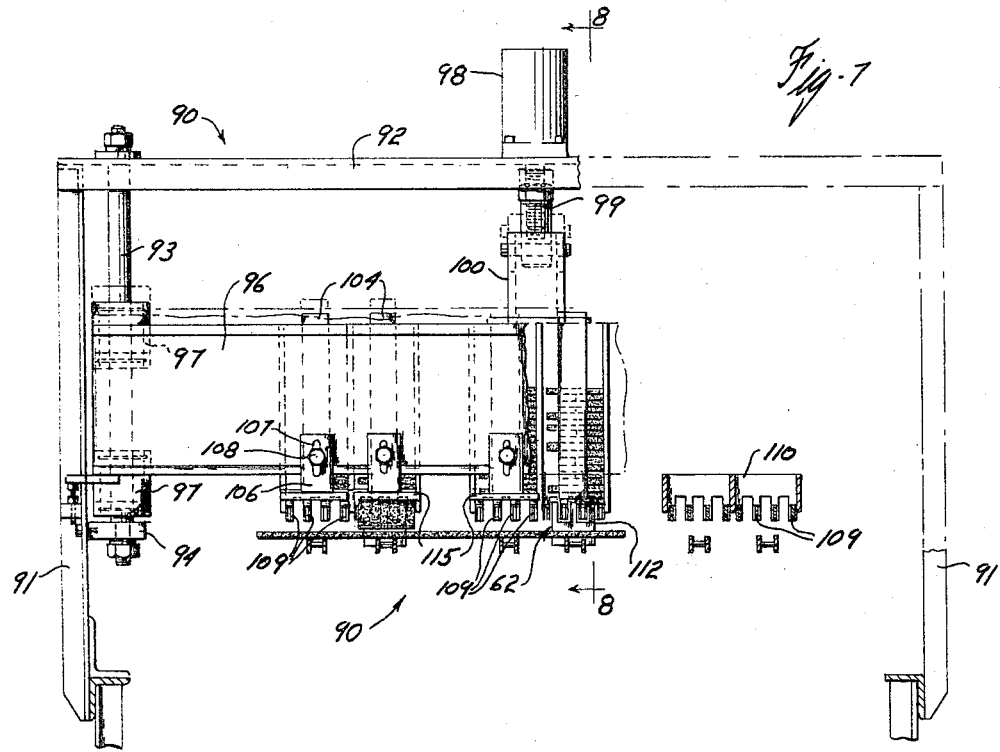
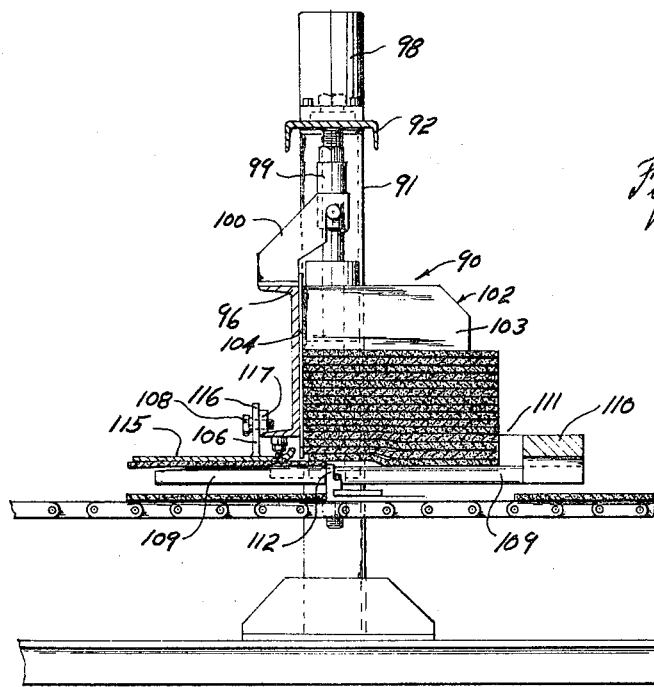

SHINGLE HANDLING APPARATUS

Filed March 25, 1968 6 Sheets-Sheet 6

INVENTORS
Albert A. Adams
James E. Geigerich
BY
Synnestvedt & Lechner
ATTORNEY

United States Patent Office 3,562,070
Patented Feb. 9, 1971

3,562,070
SHINGLE HANDLING APPARATUS
Albert A. Adams, Malvern, and James E. Giegerich, Norristown, Pa., assignors to Certain-Teed Products Corporation, Ardmore, Pa., a corporation of Maryland
Filed Mar. 25, 1968, Ser. No. 715,774
Int. Cl. B27m 3/02; B32b 31/20
U.S. Cl. 156—560
17 Claims

ABSTRACT OF THE DISCLOSURE

Apparatus for handling shingles of the kind consisting of rectangular sheets with narrow tabs of random width superposed thereon. Hopper feeds shingle sheets one at a time to conveyor provided with mechanism for applying flowable adhesive at laterally spaced locations on each shingle with the locations of adhesive application for one shingle being different from locations of adhesive application for the next shingle. Tab dispensing mechanism is provided for the purpose of placing tabs of random width on only those locations at which adhesive is applied. Pressing means for pressing tabs against the adhesive locations and bundling means are also provided.

---

This invention relates to apparatus for assembling composite shingles made from rectangular sheet shingles with narrow tabs secured thereto. Although not limited thereto, the invention also contemplates the assembling of the composite shingles into bundles.

A composite shingle of the kind referred to is disclosed in Design Pat. No. D. 209,719, issued Dec. 26, 1967, and assigned to the assignee of the present application. The shingles disclosed therein comprise, in general, conventional rectangular sheet shingles, each consisting of a heavy asphalt impregnated paper to which a coating of colored fine stone granules is applied. According to Design Pat. No. D. 209,719, elongated tabs of random width are secured to the shingle sheets at spaced intervals lengthwise thereof. A roof to which such shingles are applied has a very attractive, rough and three dimensional textured appearance.

The primary object of the invention is the provision of apparatus for automatically assembling and bundling shingles of the kind just described.

A related object of the invention lies in the provision of mechanism for varying the location of application of the tabs on one shingle with respect to the location of application on the next shingle.

A further object of the invention is the provision of a novel adhesive applying valve mechanism for selectively applying strips of a flowable adhesive to sheet shingles.

Another object of the invention lies in providing a novel form of apparatus for laying tabs on underlying sheet shingles only at locations on which an adhesive had previously been applied.

In summary, the foregoing and various other objects of the invention are achieved by a hopper provided with means for feeding sheet shingles one at a time to a conveyor which conveys the shingles with their long axis oriented transversely of the conveyor. An adhesive applying apparatus is spaced over the conveyor and lays adhesive at spaced locations transversely of the shingles. Means are provided for varying the locations on one shingle with respect to locations on the next shingle. Mechanism is further provided for placing tabs with their long axis extending in the direction of travel of the conveyor on only those locations on the shingles at which adhesive has been applied. Preferably, the tabs are thereafter pressed against the shingles in order to effect a tight seal and the shingles are then conveyed to stacking apparatus where a predetermined number are formed into a bundle, following which the bundle is wrapped, stacked and conveyed away.

Turning now to the illustrative embodiment of the invention, the various objects mentioned above as well as various other objects will be fully understood upon reference to the following detailed description and the accompanying drawings in which:

FIGS. 1 and 1a show a side elevational view of conveying apparatus formed in accordance with the teachings of the present invention;

FIGS. 2 and 2a show a plan view of the apparatus shown in FIG. 1;

FIG. 3 is a sectional view, on an enlarged scale, taken along line 3—3 of FIGS. 1 and 2;

FIG. 4 is a sectional view, on an enlarged scale, taken along line 4—4 of FIG. 3;

FIG. 4a is a detailed view, on an enlarged scale, as compared with FIG. 4, showing portions of the structure of FIG. 4;

FIG. 5 is a sectional view, on an enlarged scale, taken along line 5—5 of FIGS. 1 and 2;

FIG. 6 is a sectional view, on an enlarged scale, as compared to FIG. 5, taken on line 6—6 of FIG. 5;

FIG. 7 is a sectional view, on an enlarged scale, taken on line 7—7 of FIGS. 1 and 2;

FIG. 8 is a sectional view taken on line 8—8 of FIG. 7;

FIG. 9 is an enlarged sectional view taken on line 9—9 of FIGS. 1 and 2; and

FIG. 10 is a sectional view taken on line 10—10 of FIG. 9.

Figure 1:
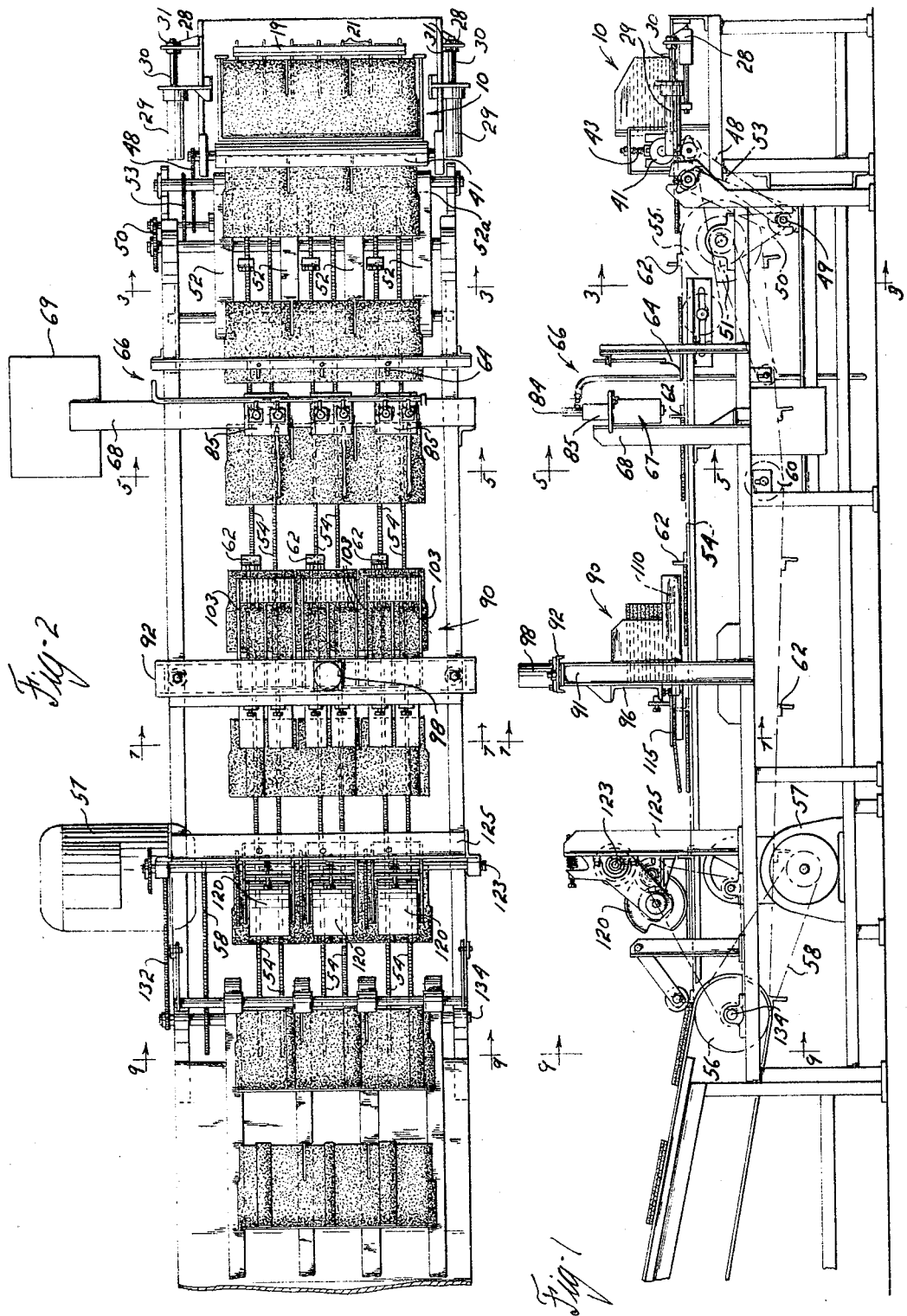

Attention is first directed to FIGS. 1, 1a, 2, and 2a, showing an overall plan and elevational view of a conveyor and associated equipment incorporating the essential features of the invention. As shown in FIG. 1, a hopper 10 in which is stored a stack of sheet shingles is located at the right hand side of a conveyor. Although hopper 10 may be machine loaded, in a typical operation, an attendant whose duties will also be to oversee operation of the machine can easily manually load a supply of shingles in the hopper.

The hopper is shown in detail in FIGS. 3 through 4a, it being provided with side walls 11, a transversely extending rear wall 12 and a floor 13 which is connected to the walls 11.

The lower edge of rear wall 12 terminates above the level of the floor 13 in order to allow a space 14 through which shingles can be fed one at a time. Preferably, adequate space is allowed in order to account for shingles of varying thicknesses; the required spacing is then provided for by vertically extending gauging plates 15 which are presettable to a height which provides clearance for only one of the particular kind of shingles being handled. As should be evident from the foregoing and upon reference to FIG. 1, once it is established that a shingle of a given thickness is to be fed through the hopper, the vertically extending plates 15 which are bolted to the wall 12 by means of bolts 16 (FIG. 3) fitting through slots 17, are set in a vertically adjusted position which will allow clearance through the opening 14 for only a single shingle.

Feed means comprising a pusher bar 19 (see FIGS. 3, 4, and 4a) is provided for the purpose of stripping shingles from the bottom of the stack. Bar 19 is mounted for sliding movement across the floor 13; it has a thickness approximately equal to the thickness of a shingle and is provided with a tapered leading edge 20 as can be seen in FIG. 4a.

Elongated slots 21 are provided in the hopper floor at spaced intervals across the width of the hopper. The pusher bar 19 has secured thereto riser blocks 23 which extend through the slots 21. The riser blocks 23 are secured to a channel shaped pusher bar support 25 which extends transversely of the hopper underneath the floor 13 as can be seen in FIGS. 3 through 4a.

Bearing blocks 26 are connected to each end of the pusher bar support 25. The bearing blocks 26 are each journalled on a guide rod 27, each of which is in turn secured to suitable supporting framework underneath the hopper.

Figure 2:
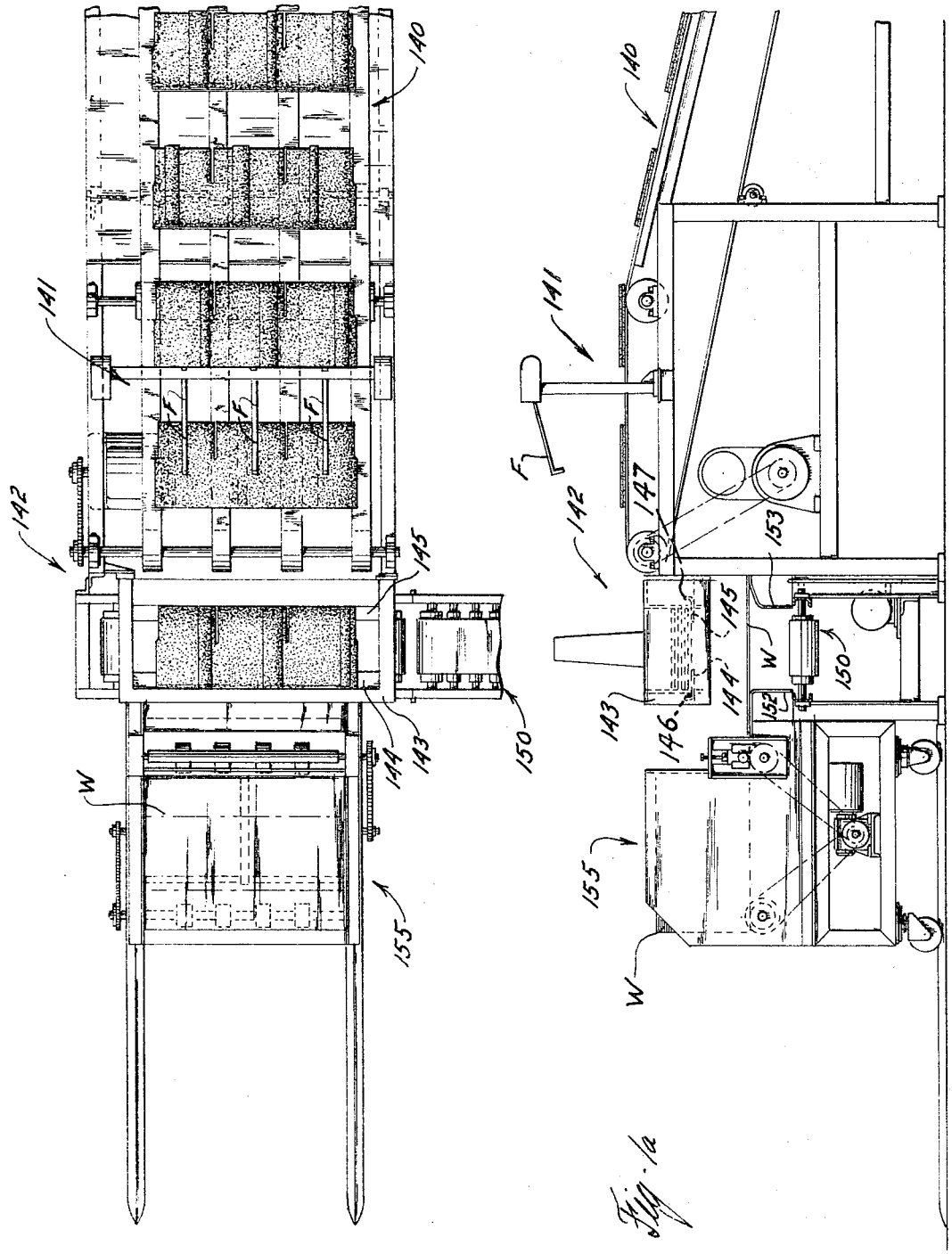

Mounted on each bearing block is a laterally extending air cylinder connection bracket 28. Air cylinders 29, shown in FIGS. 1 and 2, are secured to the frame on each side of the hopper. The cylinders are provided with piston rods 30 which are bolted to the brackets 28 by means of nuts 31.

Initial pressurization of the air cylinders 29 draws the pusher bar 19 to the left as shown in FIGS. 1, 2, 4 and 4a. During this movement, the pusher bar engages the bottom shingle in the stack and forces it out from underneath the other shingles through the opening 14. Air pressure is thereafter delivered to the other side of the pistons to retract the pusher bar.

Preferably, the pusher bar is provided with a tapered leading edge, so that it wedges underneath the next to the last shingle and engages the bottom shingle as it is moved to the left by the pressure cylinder.

Because of the tapered surface, the major portion of the bar can be made of relatively heavy stock, that is, stock of a thickness exceeding that of a single shingle, so that it will resist the bending stresses resulting from the weight of a heavy stack of shingles.

Preferably, the feed means further comprises a pair of transversely extending feed rollers 41 and 42 which are mounted directly adjacent to the exit end of the hopper 10. As can be seen in FIG. 3, roller 41 is spring urged downwardly against the roller 42 by means of coil springs 43 which are held in position by guide rods 44 bolted to the frame.

Roller 42 is mounted for rotation directly underneath roller 41 and is adapted to be driven by a chain drive 48, driven by a sprocket 48a, secured to a shaft 49. The shaft 49 is in turn driven by a chain drive comprising a chain 50 meshing with a sprocket 51 secured to the shaft, all as described in more detail hereinafter.

Rollers 41 and 42 are positioned so that the pusher bar feeds each shingle into the nip formed between them. These rollers are covered with a material having a relatively high coefficient of friction and grip the shingle, further drawing it to the left as viewed in FIG. 4, until it is entirely out of the hopper 10.

The rollers deposit each shingle on an intermediate section of conveyor comprised of a series of transversely spaced flexible belts 52. At the end of the conveyor run nearest the hopper 10, the belts 52 are mounted on rollers 52a which are secured to a support shaft and driven by a sprocket drive comprising chain 53 which meshes with a sprocket wheel 53a keyed to the support shaft and a sprocket wheel 53b secured to the shaft 49. The belts 52 are also formed of a material having a relatively high coefficient of friction so that slippage between the shingles and the belts is minimized.

The belts transfer the shingles onto what will hereinafter be called the main conveyor of the system. This conveyor is preferably comprised of a series of transversely spaced pivotal link type chains 54. The upper surfaces of chains 54 form a supporting surface for the shingles, the limits of which are defined by the sprocket wheels 55 and 56 with which the chains are enmeshed. The sprocket wheels 56 are located at the left hand end of the conveyor as viewed in FIG. 1 and are driven by a motor 57 via a drive chain 58. Suitable idler sprockets 60 engage the chains along their bottom runs. These sprockets are adjustably mounted in known manner so as to maintain the required amount of tension on the upper run of the chains.

In the illustrative embodiment of the invention, six chains 54 are provided and these are provided with upstanding pusher lugs 62. Preferably, these pusher lugs 62 are disposed at regular intervals along the chains. According to the preferred embodiment of the invention, the lugs are arranged in groups or sets of three with the lugs of each group being in transverse alignment with each other, and the lugs of certain groups being offset laterally with respect to those of other groups.

One purpose of the lugs 62 is to properly orient the shingles on the main conveyor and to push the shingles to the left, as viewed in FIGS. 1 and 2. In operation, the aligned lugs of three chains will move into engagement with the trailing edge of each shingle. In order to ensure that all three lugs bear against the trailing edge of the shingle, flexible fingers 64 are positioned in the path of travel of the shingles at a point just beyond where the shingles are moved onto the main conveyor. As the shingles encounter these fingers, the fingers retard their movement so that they move relatively to the chains on which they ride until all lugs of a group of three lugs move into engagement with the trailing edge of a shingle. Upon continued movement the flexible fingers yield and the aligned shingle is advanced to a station at which adhesive is applied at a plurality of locations spaced from each other transversely of each shingle.

Preferably, the adhesive employed is a flowable asphalt material and is applied by gravity flow onto the upper surface of each shingle. For this purpose an adhesive reservoir, shown generally at 66, is located immediately to the left of the fingers 64 as viewed in FIGS. 1 and 2, above the surface of the conveyor and overlying the path of travel of the shingles.

FIGS. 5 and 6 illustrate a preferred form of adhesive reservoir and applying mechanism. According to the illustrative embodiment, the reservoir comprises a trough 67 which is secured to the conveyor frame by means of angle bars 68. This trough is connected to a source of hot asphalt, diagrammatically illustrated at 69, from which heated asphalt is continuously pumped. A gravity feed line, not shown, leads from the bottom of the trough to the source of supply, so that excess material is returned and thus a continuous circulation of hot flowable asphalt is maintained.

Located within the trough 67 is an inner chamber or valve tank 70 of relatively small volume. Valve tank 70 may be formed by an inverted channel 71 which is secured by welding to the bottom of the trough. The ends of channel 71 are sealed by plates 72.

Asphalt flows into the valve tank 70 through a plurality of passageways 73, each of which is covered with a cylindrical filter 74 provided for the purpose of filtering out impurities which might otherwise interfere with the discharge of hot asphalt. The filters are provided at spaced intervals, there being three shown in the illustrative embodiment.

Asphalt is dispensed via nozzles 75 located in the bottom wall of valve chamber 70. One nozzle is provided for every location on which adhesive is to be applied on the shingles. As can be seen in the drawings, especially FIGS. 2 and 5, six nozzles are provided in the illustrative embodiment. Each nozzle is fitted with a valve member 76 which is journalled in a bushing 77 mounted in the trough cover and also in a bushing 78 provided in the transverse web of the channel 71. The valve members 76 are provided with reduced diameter end portions 79 which fit within the orifices 80 in each nozzle 75. A chamfered portion 81 interconnects the reduced diameter portion 79 with the enlarged body portion.

According to the invention, the reduced diameter portion of each valve member is long enough so that whenever the valve member is in the lower position, it extends somewhat beyond the orifice 80. In this position, the chamfered portion 81 rests on a conical seat 82 formed inside the nozzle.

Each of the valve members 76 is controlled by a separate air cylinder 84 within which pistons, not shown, are fitted. The air cylinders are mounted on brackets 85 located above the trough. The end of the piston rod for each cylinder is provided with a bifurcated extension 86 which is secured to the upper end of the valve member 76 by means of a transversely extending pin 87.

The valves are biased to the lowered position and in operation are arranged to be supplied with air under pressure in groups of three and, according to the preferred embodiment of the invention, the groups are supplied with air on an alternating sequence with the first, third and fifth pressure cylinders being operated simultaneously, followed by the second, fourth and sixth cylinders. Upon operation of any given group of pressure cylinders, the respective valve members are lifted, thus allowing hot asphalt to flow through three of the orifices 80. Thus, three streams of asphalt can be made to flow onto each shingle at laterally spaced locations as the shingle passes underneath the adhesive supply. Because of the alternating sequence of valve operation, the locations on one shingle are laterally offset with respect to the locations on the next shingle.

Operation of the pressure cylinders is timed in relation to the movement of the conveyor, so that the valve members open just after the leading edge of a shingle moves under the nozzles and are closed just before the trailing edge passes beyond the nozzles. Strips of adhesive as shown in FIGS. 2 and 6 are thereby laid.

An important structural feature of each valve member lies in the formation of the reduced diameter end portion so that it extends well beyond the end of the nozzle when the valve member is in the lowered position. This provides a positive seal for the orifice and when the sticky asphalt accumulates around the bottom of the orifice, as it has a tendency to do, this is cleaned away by the wiping action which takes place as the valve member is raised and lowered.

After leaving the station at which the adhesive is applied, the shingles are advanced to a mechanism for dispensing and laying the tabs upon only those locations at which adhesive has been applied. For this purpose, a tab dispensing hopper apparatus 90, shown in FIGS. 1, 2, 7 and 8, is provided. This apparatus is mounted on a frame including vertically extending channel members 91 on the top of which a transversely extending channel member 92 is mounted. A pair of guide rods 93 hang from the channel member 92, as can be seen in FIG. 7 and the bottoms of the guide rods 93 are secured to the vertically extending channels 91 by means of a retainer bracket 94.

As shown in FIGS. 7 and 8, a channel member 96 extends transversely of the conveyor between the channel members 91. Bearing blocks 97 (FIG. 7), one of which is mounted on each end of the channel member 92, are slidably mounted on the guide rods 93, thereby guiding the channel member 96 for movement in a vertical plane relative to the main conveyor. Such movement is accomplished by air cylinder 98, located centrally of the channel 92. The air cylinder 98 is provided with a piston rod 99 which is connected to the channel member 96 by means of a connecting bracket 100. By way of the foregoing, the hopper is free for movement in a vertical plane from a lowered position adjacent the surface of the conveyor to a raised position somewhat away from the surface.

A plurality of tab storing hoppers 102 are secured to the channel member 96. According to the invention, one hopper is provided for each location at which adhesive is applied on a sheet shingle, there thus being six hoppers in the illustrative embodiment of the invention.

Each hopper is comprised of side wall portions 103 which are spaced sufficiently far enough apart to provide clearance for the tabs. Since the tabs are of varying width, the spacing of the hopper side walls should be slightly greater than the widest tab contemplated. The rear wall of each hopper 102 is formed by the right hand surface of the web of channel member 96 as that member is viewed in FIG. 8.

Bolted to the rear hopper wall within each hopper is an elongated gauging plate 104, each plate being secured to the wall by means not shown. Plate 104 can be clamped in position so that its lower surface clears a bottom support structure to be described hereinafter by an amount slightly exceeding the thickness of one shingle tab.

The bottom support for each hopper comprises a plurality of elongated support bars or fingers 109 which are laterally spaced apart and extend in the direction of movement of the main conveyor. Preferably, the support bars 109 extend well beyond the rear wall of the hopper, as can best be seen in FIG. 8. Bars 109 are preferably bolted to transversely extending blocks 110 which are, in turn, secured to extensions 111 which are integral with the hopper side walls.

As pointed out above, the upstanding lugs 62 provide a means for aligning and pushing the shingles along the conveyor. Another function of these lugs will now be described. As can be seen in FIG. 7, each lug 62 is comprised of a plurality of upstanding fingers 112. These fingers are adapted to fit within the spaces formed between the parallel bottom support bars 109. The lug fingers 112 extend in a vertical plane to a point of termination just far enough beyond the upper surface of the support bars to engage only the bottom tab in a hopper, as can best be seen in FIG. 8.

Thus, as the lugs enter the slots between the support bars, the fingers encounter a bottom tab and force this tab to the left as viewed in FIG. 8, stripping it out from underneath the stack. As the tab moves beyond the left hand end of its supporting bars 109, it drops down into position on the underlying shingle sheet.

To prevent premature tipping of the tabs, we mount a plate 115 just above each set of the support bars at the exit end of each hopper. Preferably, plate 115 extends somewhat beyond the ends of the support bars as can be seen in FIG. 8; it is provided with an upstanding portion 116 by which it can be bolted to a bracket 117 which is welded to the lower flange of the channel 96.

Preferably, the upper surface of the left hand end of each support bar 109 is beveled somewhat, as may be seen at 118 in FIG. 8. Thus, when the stripping fingers push the tabs clear of the ends of fingers 109, the point of contact between tab and finger lies well below the upper surface of the finger, and the chances of a finger slipping under a tab as the tab begins to tilt are substantially eliminated.

With the foregoing, we have found that the relatively stiff tabs are virtually always dropped down onto the shingles in properly oriented positions.

It should be observed that with six hoppers mounted in side-by-side relationship and with two groups of lugs displaced from each other along the path of travel of the conveyor, operation of the adhesive laying means can be coordinated therewith so that tabs are laid only on those locations on the shingles at which adhesive has been applied. Obviously, variations of the grouping of the lugs or the number of lugs and hoppers can result in variations in the tab laying capabilities of the apparatus. For example, if the sets of lugs are arranged in groups of two, rather than groups of three, any given shingle would only have two tabs applied thereto and three successive shingles would have tabs applied at three different locations. In fact, a number of combinations can be selected in order to achieve different end results, as will readily occur to those skilled in the art. Similarly, different effects can be achieved by loading certain of the hoppers with tabs of the same width while loading others with tabs of other widths or by loading all hoppers with tabs of random width.

Following application of the tabs to the locations on the shingles at which adhesive is applied, it is generally desired that the tabs be pressed into contact with the adhesive coated section of the shingle in order to assure that a tight seal is provided.

Preferably, pressure sealing of the tabs is effected by means comprising rotating cylinders or rollers 120 shown in FIGS. 1 and 2 and also on an enlarged scale in FIGS. 9 and 10. Preferably, each such cylinder is wide enough to cover two adhesive application stations. The rollers are each mounted on shafts 120a which are journalled in support brackets 121, each bracket being provided with a pair of parallel roller support arms 122. The arms are journalled for limited rocking movement on a shaft 123 which is, in turn, journalled in supports 124 mounted on upright supports 125 secured to the conveyor frame at either side thereof.

Means are provided for rotating the shaft 123 comprising a gear 128 keyed to one end thereof, as is best shown in FIG. 9. Gear 128 is preferably driven by a gear 129 which is mounted on a sleeve 130 to which is secured a sprocket wheel 131. A chain 132 transmits power to the sprocket wheel 131, via a second sprocket wheel 133 which is mounted on a shaft 134 which is driven by the motor 57 through the chain 58.

One end of each shaft 120a has a toothed sprocket wheel 136 secured thereto. A cooperating sprocket wheel 137 is keyed to the shaft 123 immediately opposite each sprocket wheel 136. Sprocket chains 138, one for each shaft 135, mesh with the sprocket wheels 137 and 136 and transmit rotary motion to the rollers. By selection of appropriate gear and sprocket ratios, the tangential velocity of the cylinders is approximately equal to the speed of advance of the shingles.

As the rollers are in the path of the upstanding lugs, means must be provided to prevent interference therewith as the shingles are moved along the conveyor. This is accomplished by fashioning the cylindrical surface of each roller so that it is interrupted as viewed in section in FIG. 10, the interruptions or cut-outs being somewhat triangularly shaped when viewed in side elevation. The rollers are secured to the shaft in such position that the leading edge of an interruption reaches the conveyor surface at the same time as an upstanding lug. Thus, each roller can press the tab firmly into an engagement with the adhesive on the shingle and can also provide clearance for the upstanding lug which immediately follows such tab.

As noted above, three rollers are preferably provided in an arrangement wherein six tabs are secured to a shingle sheet and wherein the tabs are applied in the sequence above described. Accordingly, with this sequence, each roller is provided with two cut-outs, one being spaced 180° from the other.

After the tabs are pressed against the adhesive on the underlying shingle sheets, they travel to an inclined conveyor which delivers them to a suitable stacking apparatus which is provided for the purpose of forming stacks or bundles each comprising a predetermined number of shingles and for wrapping the bundle in a corrugated wrap.

A preferred form of stacking and wrapping equipment is disclosed in FIGS. 1a and 2a. The equipment shown in FIG. 1a is of the kind described and claimed in U.S. Pat. Nos. 2,996,862 and 3,128,889, both owned by the assignee of the instant application, and is briefly described herein in order to give a full picture of an assembly line of the kind which the present invention forms a part, and because the structure possesses certain unique advantages when shingles of the kind herein described are handled. As shown in FIG. 1, the shingles leave the main conveyor and proceed up an inclined conveyor section 140. The end portion of the conveyor section 140 is level as identified by the reference character 141 and terminates adjacent a stacking bin 142. Before the shingles are stacked in the bin 142, in a manner to be presently described, it is desirable to invert every other shingle so that when the shingles are stacked, the tabs on one shingle fit within the spaces between the tabs on the next shingle. For this purpose, fingers F are positioned at a point adjacent the end of the level portion 141 of conveyor 140. The fingers have hook-like portions which are movable into the path of every other shingle so that the hook-like portions engage the leading edge of the shingle and lift it up as the following edge is pushed forwardly. Eventually a point is reached at which the leading edge falls down onto the conveyor and becomes the following edge, as is explained in Johnson and Robinson Pat. No. 3,128,889. The bin 142, in which the shingles are deposited, is comprised of wall portions 143 and a floor consisting of hinged gate members 144 and 145. Gate 144 is pivotally mounted on a hinge pin 146 and gate 145 is pivotally mounted on a hinge pin 147. Suitable mechanism including air pressure cylinders swing the gates from the raised position shown in FIG. 1a to a lowered position in which the gates extend in substantially vertical planes.

With the gates in the position shown in FIGS 1a and 2a, shingles travel off the end of the conveyor 140 and drop onto the stacking bin where they are held until a pre-determined number has been accumulated, the count being registered on suitable counting mechanism of known construction. Immediately underlying the stacking bin is a transversely extending conveyor section 150 which may be of the traveling belt type. Associated with the conveyor 150 immediately below the stacking bin 142 are provided guide plates 152 and 153. The guide plates are adapted to provide support for corrugated wrapper sheets W which are fed underneath the stacking bin by means of a wrapping device indicated generally by the reference character 155. Briefly stated, the wrapping device comprises a hopper or bin within which a stack of corrugated wraps is stored. Means are provided for feeding the wraps one at a time from the bottom of the bin into a position in which each wrap is supported by the upper surfaces of plates 152 and 153.

When a predetermined number of shingles are accumulated in the bin 142, the gates 144 and 145 are dropped downwardly allowing the bundle to fall onto the wrap W. The weight of the shingles causes the sides of the wrap to fold upwardly against the side edges of the bundle. Preferably, the wraps are scored along the lines at which they are intended to be folded, that is, along lines which provide for a bottom section of approximately 12" in width, suitable side sections dimensioned according to the height of the bundle of shingles and portions which are folded over the top of the bundle, these portions typically being about 3" in width.

After the wrapper has been folded around the bundles, suitable means may be provided for securing the wrap either manually or automatically.

Operation of the equipment described above will now be reviewed. Assuming that a stack of sheet shingles is loaded in the magazine 10, that hot tar is circulating through the adhesive applying mechanism 66 and that tabs of random width are loaded in the hoppers 90, the assembly of sheet shingles is ready to commence. Suitable control mechanism causes air cylinders 29 to reciprocate the pusher bar 19, thus stripping shingles from the hopper 10. These shingles are picked up by the rollers 41 and 45 and are delivered to the intermediate conveyor section 52 which transfers them to the main conveyor of the invention. As they move onto the main conveyor of the invention, fingers 64 retard their movement somewhat, so that they are moved into aligned relationship with their trailing edges bearing against the lugs 62 and with their long axes extending transversely of the direction of travel of the conveyor. Continued movement of each shingle brings it underneath the adhesive applying mechanism 66 and at this point selected ones of the adhesive valves are operated so that strips of adhesive are laid down at transversely spaced locations. As mentioned above, the valves are operated according to a predetermined sequence so that the locations of application of adhesive on one shingle are varied from one shingle to the next.

Further movement of the shingles brings them to the hopper dispensing mechanism and as the shingles move underneath the tab hoppers, the fingers on the upstanding lugs pick up the bottom tab from any hopper overlying a location on the sheet shingles on which adhesive has been applied.

At this point, it should be noted that when the hoppers are loaded, the tabs are advantageously located so that one side edge bears against one of the hopper side walls. This side wall in effect acts as a guide for the tabs as they are stripped from the hopper preventing sideways or swinging movement of each tab as it leaves the hopper.

With the tabs laid down on those locations on which adhesive is applied, the shingle sheets next progress to a station at which the tabs are firmly pressed into the adhesive. Thereafter, the assembled shingles are delivered to the stacking mechanism where they are stacked according to number, bundled and delivered to a suitable unloading station.

In use the apparatus has proven to be extremely effective, being simple to operate and quite reliable. The shingles so formed can be made in an economical manner and produces an extremely attractive appearance when applied to a roof.

I claim:

1. Apparatus for assembling shingles of the kind consisting of rectangular shingle sheets having narrow tabs superposed thereon, said apparatus comprising a conveyor for advancing said sheets one at a time along a path leading to a bundling station, said sheets being oriented on said conveyor with their long axis extending transversely of the direction of conveyor travel, adhesive dispensing mechanism above said conveyor for laying patches of adhesive on each shingle sheet at laterally spaced apart locations, means for laterally shifting the location of application of said adhesive patches on some shingles with respect to others, tab hoppers spaced transversely of said conveyor in position to deposit tabs on said adhesive patches, and tab dispensing devices on said conveyor, said devices being movable therewith and engageable with selected tabs for laying tabs on only those locations on which adhesive has been applied.

2. Apparatus according to claim 1, further including tab pressing means located along said conveyor path at a point beyond said tab magazine, said pressing means being adapted to press the tabs into firm engagement with the adhesive patches on said shingle sheets.

3. Apparatus according to claim 2, wherein said tab dispensing devices comprise groups of laterally spaced apart upstanding lugs movable with said conveyor, said groups of lugs being spaced along said conveyor at regular intervals, each group being adapted to push a shingle sheet along said conveyor and further wherein each group is laterally offset with respect to the succeeding group, the lugs of the groups being oriented to engage tabs in only those hoppers overlying adhesive patches and being operable to strip the engaged tabs from the hoppers onto said patches upon movement of the conveyor.

4. Apparatus according to claim 3, further including a pressure mechanim for pressing each dispensed tab firmly against the adhesive patch, said pressure mechanism comprising rollers above said conveyor, means urging said rollers downwardly against the surface of the shingle sheets, and drive means for rotating said rollers synchronously with the movement of the conveyor.

5. Apparatus according to claim 4, wherein the surfaces of said rollers are in the path of said lugs and are provided with cut-outs at circumferentially spaced intervals to provide clearance for said upstanding lugs.

6. Apparatus for assembling shingles of the kind consisting of rectangular sheets having narrow tabs superposed thereon with the tabs on one shingle being laterally displaced with respect to the tabs on the next shingle, said apparatus comprising a shingle magazine, means associated with said magazine for dispensing shingles from said magazine one at a time, a conveyor adjacent said magazine for moving said shingles in a path extending away from the magazine, said shingles being oriented on said conveyor with their long axis extending transversely of the line of movement of the conveyor, adhesive applying mechanism for laying down adhesive on said shingles at a plurality of laterally spaced locations, said adhesive applying mechanism including means to laterally shift the locations of adhesive application on one shingle with respect to the following shingle, a plurality of tab hoppers disposed in side-by-side relationship over said conveyor, there being one tab hopper for each location of adhesive application, and tab engaging means on said conveyor and movable therewith, said tab engaging means cooperating with said hoppers for laying down a tab only on those locations on a shingle on which adhesive has been applied.

7. Apparatus according to claim 6, wherein said adhesive applying means comprises a reservoir for a supply of flowable adhesive above said conveyor, a plurality of valves in the bottom of said reservoir, said valves being spaced at intervals across said conveyor, there being two groups of valves, means for operating said two groups of valves in sequence, one group of valves depositing adhesive at locations laterally shifted with respect to the locations at which the other group of valves deposits adhesive.

8. Apparatus according to claim 7, wherein said groups of valves are operated in an alternating sequence.

9. Apparatus for assembling shingle bundles, each consisting of a stack of rectangular shingle sheets having relatively narrow tabs superposed thereon with the tabs on one shingle in the stack being laterally displaced relatively to the tabs on the next shingle in the stack, said apparatus comprising a conveyor having groups of upstanding lugs spaced along the surface thereof at intervals which provide clearance for a shingle sheet with the long axis of each shingle sheet oriented transversely of the direction of movement of the conveyor, the lugs of one group being laterally offset with respect to the lugs of the next group, the lugs of each group being adapted to engage the trailing edge of a shingle to orient and move shingles along said conveyor path, means for applying adhesive to said shingles at a plurality of laterally spaced locations with the locations on one shingle being laterally spaced with respect to the locations on the next shingle, a plurality of tab hoppers disposed in side-by-side relationship over said conveyor, there being one tab hopper for each adhesive location, each hopper being adapted to store a stack of tabs having a length approximately corresponding to the dimension of the shingle along its short axis, said hoppers being in substantial alignment with said lugs and said lugs being engageable with the bottom tab in the hoppers to strip said bottom tab upon movement of the lug beneath the hopper which is in alignment therewith, the groups of lugs being oriented with respect to the hoppers to effect stripping of tabs only onto those locations on the shingles on which adhesive is applied.

10. Apparatus according to claim 9, wherein the floor of each of said hoppers includes a plurality of laterally spaced apart bars extending in the direction of travel of the conveyor for supporting the tabs in each hopper, said lugs being dimensioned so as to extend upwardly between said bars beyond the upper surface of said bars to an extent permitting engagement with only the bottom tab of a stack, said bars extending beyond the hopper in the direction of travel of the conveyor and a gauging plate spaced above said bars, said gauging plate allowing for the stripping of only one tab from the stack of tabs in the hopper.

11. Apparatus according to claim 10, further including cylindrical tab press means located further along the path of travel of the conveyor than the tab hoppers, said cylindrical tab press means being adapted to press the tabs into sealing engagement with the shingle sheets.

12. Apparatus according to claim 11, wherein said cylindrical tab press means comprises a plurality of rollers, means urging said rollers into engagement with the shingle sheets as they move on said conveyor under the rollers, the surface of said rollers having circumferentially spaced cut-away portions providing clearance for said upstanding lugs.

13. Apparatus according to claim 10, further including means mounting said tab hoppers for vertical movement relative to said conveyor lugs to prevent stripping of tabs therefrom in the absence of shingle sheets on said conveyor.

14. Apparatus according to claim 10 further including means for restraining the tilting of a tab as it is stripped from the stack of tabs comprising a plate spaced over the portion of said bars extending beyond the hopper.

15. Apparatus for assembling shingles of the kind consisting of rectangular sheets having narrow tabs superposed thereon with the tabs on one shingle being laterally displaced with respect to the tabs on the next shingle, said apparatus comprising, a conveyor for sequentially advancing shingle sheets along a path leading to a bundling station, upstanding guide projections on said conveyor for aligning the shingles with their long axis being oriented transversely to the direction of conveyor travel, a dispensing mechanism mounted above said conveyor for laying down strips of a flowable adhesive on said shingles at a plurality of laterally spaced locations, means for changing the location of adhesive application on one shingle with respect to the next shingle, a plurality of tab hoppers disposed in side-by-side relationship over said conveyor, there being one tab hopper for each location of adhesive application and means including shingle aligning guide projections for laying down tabs on said shingles, said projections being engageable with the bottom tabs in only those hoppers overlying shingle locations on which adhesive has been applied and being operative to strip said tabs from said hoppers and to deposit said tabs on said adhesive locations.

16. Apparatus according to claim 15, wherein said tab hoppers are comprised of side walls, a floor, and a front wall terminating above said floor by an amount providing clearance for the bottom tab of a stack of tabs in the hopper, said floor being comprised of separate support bars spaced apart to provide clearance for the guide projections with the top of the projections in contact with the rear edge of the bottom tab in the hopper, said support bars projecting beyond the front wall of the hopper by an amount which provides continued support for a tab as it is pushed from the stack by the projections, and a plate spaced above the projecting ends of the support bars to restrain tilting movement of a tab as it is stripped from the stack.

17. Apparatus according to claim 16, wherein the upper surface of the projecting portions of said bars inclines downwardly in the direction of movement of the tabs, whereby the point of contact of the tab and guide projections shifts downwardly along the guide projections as the tab is moved off the support bars.

References Cited
UNITED STATES PATENTS

| | | | |
|---|---|---|---|
| 2,625,978 | 1/1953 | Patterson | 156—562 |
| 2,638,983 | 5/1953 | Ward | 156—561X |
| 3,033,739 | 5/1962 | Klein | 156—561 |
| 3,104,193 | 9/1963 | Hibbert et al. | 156—561X |
| 3,162,937 | 12/1964 | Schweiker | 156—561X |
| 3,177,568 | 4/1965 | Schweiker | 156—561X |

BENJAMIN A. BORCHELT, Primary Examiner

J. M. HANLEY, Assistant Examiner

U.S. Cl. X.R.

144—13; 156—562